United States Patent [19]

Devic

[11] Patent Number: 5,987,582
[45] Date of Patent: Nov. 16, 1999

[54] METHOD OF OBTAINING A BUFFER CONTIGUOUS MEMORY AND BUILDING A PAGE TABLE THAT IS ACCESSIBLE BY A PERIPHERAL GRAPHICS DEVICE

[75] Inventor: Goran Devic, Austin, Tex.

[73] Assignee: Cirrus Logic, Inc., Fremont, Calif.

[21] Appl. No.: 08/724,566

[22] Filed: Sep. 30, 1996

[51] Int. Cl.[6] .................................................... G06F 12/10
[52] U.S. Cl. ........................ 711/206; 711/203; 345/515
[58] Field of Search .................................. 711/206, 202, 711/203; 345/522, 515

[56] References Cited

U.S. PATENT DOCUMENTS

| | | | |
|---|---|---|---|
| 4,285,040 | 8/1981 | Carlson et al. | 711/206 |
| 4,583,185 | 4/1986 | Heartz et al. | 364/521 |
| 4,586,038 | 4/1986 | Sims | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 5,107,417 | 4/1992 | Yokoyama | 711/206 |
| 5,126,726 | 6/1992 | Howard et al. | 340/728 |
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,301,287 | 4/1994 | Herrell et al. | 711/202 |
| 5,313,577 | 5/1994 | Meinerth et al. | 345/515 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |
| 5,675,762 | 10/1997 | Bodin | 711/206 |
| 5,793,385 | 8/1998 | Nale | 345/515 |

FOREIGN PATENT DOCUMENTS

WO 96/36011  11/1996  WIPO ............................. G06T 3/00

OTHER PUBLICATIONS

U.S. application No. 08/720,396 filed on Sep. 30, 1996 by McDonald et al.
*Based on US APP 08/438,860 filed May 10, 1995.

*Primary Examiner*—Eddie P. Chan
*Assistant Examiner*—Yamir Encarnanin
*Attorney, Agent, or Firm*—Anthony C. Murabito; Steven A. Shaw

[57] ABSTRACT

In a computer system, a peripheral graphics device (PGD) accesses a graphics buffer (GB) wherein the GB physical pages can be contiguous or discontiguous. A request is received to allocate memory for a GB of a predetermined size and handle. The number of pages within the size parameter is determined based on the page size used by the computer system and the buffer size needed. A first memory block is allocated for storing the GB and locked to prevent swapping. A starting virtual address of a CPU page table (CPU/PT) is accessed and mapped to a starting logical address to allow traversal of the CPU/PT by a user application. A second memory block is allocated for building a graphics device page table (GDPT) that can be accessed by a PGD. The logical address of each GB page is sequentially accessed and the corresponding physical address of each GB page is determined from the CPU/PT. The logical and physical addresses of each GB page are stored into the GDPT. If all physical pages of the GB are contiguous, the logical and physical addresses of the GB are stored into a database indexed by a user handle. Otherwise, the starting address of the GDPT is stored into the database indexed by a user handle. Provided that all of the GB physical pages are contiguous, the PGD accesses the GB by its starting physical address. Otherwise, the PGD uses the GDPT to access the discontiguous physical pages of the GB.

12 Claims, 4 Drawing Sheets

METHOD OF OBTAINING A BUFFER CONTIGUOUS MEMORY AND BUILDING A PAGE TABLE THAT IS ACCESSIBLE BY A PERIPHERAL GRAPHICS DEVICE

FIELD OF THE INVENTION

The present invention relates to the field of computer controlled graphics display systems. Specifically, the present invention relates to a method for: (1) determining whether pages of a graphics buffer are contiguous in physical memory space, and (2) building a graphics device page table so that a peripheral graphics device can read the pages of the graphics buffer if the pages of the graphics buffer are not contiguous in physical memory space.

BACKGROUND OF THE INVENTION

Generally, in computer systems having a peripheral device (e.g., a peripheral graphics device), the peripheral device is only allowed access to the physical memory portion of the system, not the virtual to physical memory mapping resources. Therefore, the peripheral device cannot readily access memory blocks in the computer system which are not contiguous in physical memory space. Typical peripheral devices are designed to access memory blocks, stored in a host computer system, by use of a base physical memory address. If a memory block sought to be accessed by a peripheral device is not contiguous in physical memory space, a mere base physical address of the memory block is not sufficient to access that memory block.

If a memory management system is active in a host computer system, then paging may be active in which case blocks of memory can be discontiguous in physical memory space. Paging is a storage allocation technique in which programs or data are divided into fixed length blocks called pages and main storage can be divided into blocks of the same length called page frames. A page frame is comprised of a fixed region of physical memory. Pages are stored in page frames, although not necessarily contiguously. In paging schemes, pages of data can be swapped between main and auxiliary storage if needed. Paging allows virtual memory because auxiliary storage can be addressed as though it were part of main storage. Portions of a users program and data are placed in auxiliary storage, and the operating system automatically swaps them in and out of main storage as needed. Memory management systems which feature paging also employ page tables. A page table is a memory map which provides a physical address for each logical page address. Peripheral devices generally do not have the capability of accessing memory maps, including page tables.

Memory management systems which feature paging include EMM386.EXE, DOS based protected mode extenders, and various other protected mode operating systems. The virtual memory system of the Intel 80386 microprocessor, for example, includes the presence of both paging and segmentation. Segmentation is a memory management technique that allocates main memory by segments. When a segment not currently residing in main memory is required, the entire segment is transferred from secondary memory. The physical addresses assigned to the segments are maintained in a memory map. If both segmentation and paging are used, every memory address generated by a program goes through the two-stage translation process defined in Relationship (1), below;

$$\text{Virtual address } L \rightarrow \text{Logical address } N \rightarrow \text{Physical address } P \qquad (1).$$

Without segmentation, L=N. Without paging, N=P. The segmentation and paging units both contain high-speed caches to store the active portions of the various memory maps needed for address translation. The page size used by an Intel 80386 microprocessor is 4 Kilobytes.

Typical peripheral graphics devices access memory blocks, which are contiguous in physical memory space, by use of a base physical memory address. This methodology has been sufficient in the past because peripheral graphics devices did not typically require access to memory buffers comprising more than one page because the size of blocks of graphics data did not typically exceed a page. However, state of the art computer graphics systems are now being used to process blocks of graphics data which exceed a single page in size. Therefore, a method is needed for providing a peripheral graphics device with access to a memory buffer which can exceed a single page in size. Because such a memory buffer can be discontiguous in physical memory space, a method is needed to provide the peripheral graphics device with access to the memory buffer.

Accordingly, the present invention provides a method for (1) determining whether a memory block is contiguous in physical memory space, and (2) providing a peripheral device with access to the memory block if it is not contiguous in physical memory space. These and other advantages of the present invention will become apparent within discussions of the present invention herein.

SUMMARY OF THE INVENTION

In a computer system having an architecture which allows for paging and segmentation, the present invention provides a computer implemented process which provides a peripheral graphics device (PGD) with access to pages of a graphics buffer wherein the pages of the graphics buffer can be contiguous or discontiguous in physical memory space. The process of the present invention provides a plurality of computer implemented steps. Initially, the process receives a request to allocate memory for a graphics buffer of a predetermined size and handle. The number of pages within the size parameter is determined based on the page size used by the computer system and the size of the buffer required.

The process determines whether DOS protected mode interface (DPMI) services are currently active in the computer system. If DPMI services are not currently active, it is assumed that paging is not active and that the pages of the graphics buffer are contiguous in physical space. In this case, two well known steps provide the PGD with access to the contiguous pages of the graphics buffer. These two well known steps include allocating memory for the graphics buffer and storing a base address of the graphics buffer into a database indexed by a user handle.

Provided DPMI services are available, the process of the present invention determines if paging is currently active within the computer system. If paging is not currently active, it is assumed that the pages of the graphics buffer are contiguous in physical memory space and the PGD is given access to the contiguous pages of the graphics buffer via the two well known steps described above.

If paging is active, the pages of the graphics buffer can be contiguous or discontiguous in physical memory space. In this case, the process builds a graphics device page table (GDPT) in logical memory space in order to provide the PGD with access to the graphics buffer. A first memory block is allocated for storing the graphics buffer using well known memory allocation procedures which may or may not allocate contiguous physical pages. The first memory block is then locked to prevent swapping of the first memory block. A starting virtual address of a CPU page table (CPU/PT) is accessed. The starting virtual address of the CPU/PT is mapped to a starting logical address to allow traversal by a user application such as a graphics application software. A second memory block is allocated for building the GDPT. The present invention process builds the GDPT by sequentially accessing the logical address of each page of the graphics buffer and determining the corresponding physical address of each physical page of the graphics buffer from the CPU/PT. The logical and physical addresses of each page of the graphics buffer are stored into the GDPT. It is determined whether all of the pages of the graphics buffer are contiguous in physical memory space.

Provided that all pages of the graphics buffer are contiguous in physical memory space, the physical and logical addresses of the graphics buffer are stored into the database indexed by a user handle. Provided that all pages of the graphics buffer are not contiguous in physical memory space, the starting physical address and logical address of the GDPT are stored into the database indexed by a user handle. A designated bit of the physical address of the graphics buffer is set to indicate that all pages of the graphics buffer are not contiguous in physical memory space and therefore, the GDPT is required for PGD access.

In advance of the PGD accessing the graphics buffer in physical memory, the handle of the graphics buffer is accessed. The data base is used to obtain the physical address of the graphics buffer. The physical address of the graphics buffer is then forwarded to the PGD.

The PGD obtains the physical address of the graphics buffer. The PGD then determines whether a designated bit of the physical address of the graphics buffer is set. If the designated bit of the physical address of the graphics buffer is not set, then the pages of the graphics buffer are assumed to be contiguous and the PGD uses the physical address of the graphics buffer to access the graphics buffer. If the designated bit of the physical address of the graphics buffer is set, then the pages of the graphics buffer are assumed to be not contiguous and the PGD uses the present invention's GDPT to access the graphics buffer.

DESCRIPTION OF THE PREFERRED EMBODIMENTS

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "mapping" or "translating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

Figure 1:
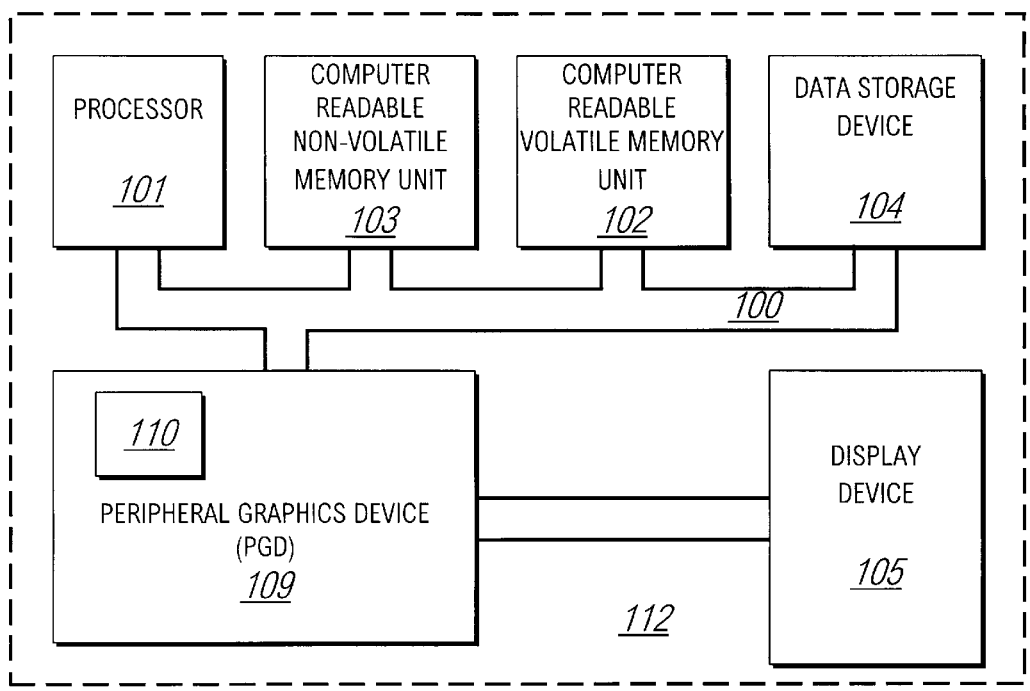
FIG. 1 is a block diagram of an exemplary host computer system, including a coupled peripheral graphics device (PGD), for employing processes of the present invention.

Refer to FIG. 1 which illustrates a host computer system 112. In general, host computer systems 112 used by the present invention comprise a bus 100 for communicating information, a central processor 101 coupled with the bus for processing information and instructions, a computer readable volatile memory unit 102 (e.g., random access memory unit) coupled with the bus 100 for storing information and instructions for the host processor 101, a computer readable non-volatile memory unit 103 (e.g., read only memory unit) coupled with the bus 100 for storing static information and instructions for the host processor 101, a data storage device 104 such as a magnetic or optical disk and disk drive coupled with the bus 100 for storing information and instructions, a display device 105 coupled to the bus 100 for displaying information to the computer user, and a peripheral graphics device (PGD) 109 coupled to the bus 100. In one exemplary embodiment, system 112 is of the well known x86 architecture.

The PGD 109 can contain a display processor 110 which executes a series of display instructions (including graphics primitives and rendering commands) found within a display list. The display processor 110 supplies data and control signals to a frame buffer which refreshes the display device 105 for rendering images on display device 105.

Figure 2A:
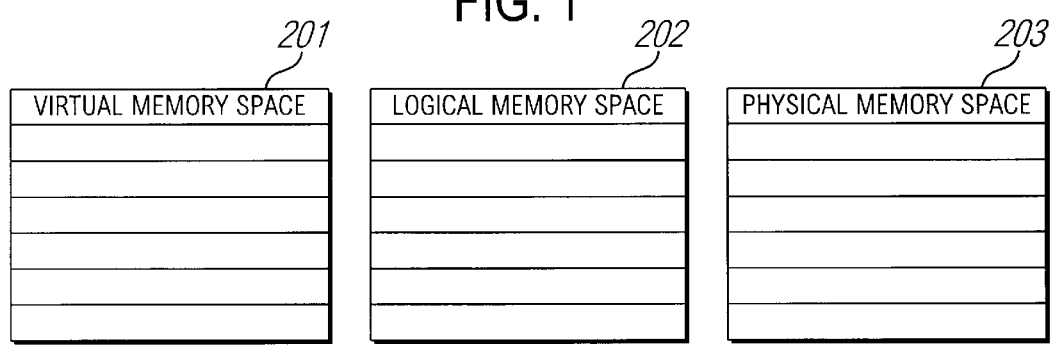
FIG. 2A is a logical diagram illustrating virtual, logical, and physical memory spaces in the exemplary host computer system.

FIG. 2A is a logical diagram illustrating virtual, logical, and physical memory spaces in the exemplary host computer system 112 of FIG. 1. Within system 112, logical memory space 202 is mapped into physical memory space 203 using paging features of the processor 101. It is appreciated that the PGD 109 of system 112 typically does not have access to the virtual memory space 202, but rather has access to the physical memory space 203. Generally, virtual memory space can only be readily accessed by the host processor 101.

Figure 2B:
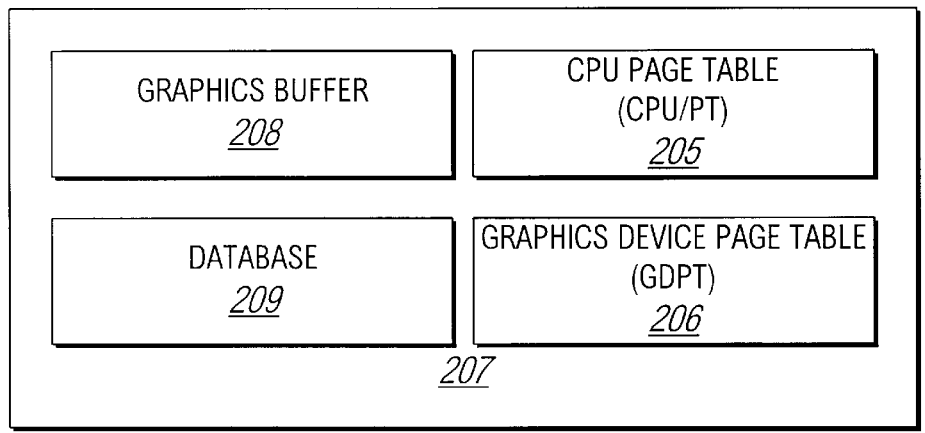
FIG. 2B is a block diagram of a memory space including a CPU page table (CPU/PT), a graphics device page table (GDPT), a graphics buffer (GB), and a database therein.

FIG. 2B is a block diagram of a memory space 207, within the exemplary host computer system 112. The memory space 207 includes, stored therein, a CPU page table (CPU/PT) 205, a graphics device page table (GDPT) 206, a graphics buffer 208, and a database 209. The graphics buffer 208 exists in physical memory space 203 and is mapped in logical memory space 202 (FIG. 2A). In a preferred embodiment of the present invention, the graphics buffer 208 can contain graphics data which can include a display list, a texture map, data, etc., or can be empty. The pages of the graphics buffer 208 are contiguous in logical memory space 202 but may or may not be contiguous in physical memory space 203. Whether or not the pages of the graphics buffer 208 are contiguous in physical memory space 203 depends on whether or not paging is active within the exemplary host computer system 112. The CPU/PT 205 maps addresses of memory blocks, including the graphics buffer 208, between logical and physical memory spaces 202, 203. If paging is not active within the exemplary host computer system 112, then the physical addresses of the pages of the graphics buffer 208 are identical to the logical addresses of the pages of the graphics buffer 208 and the CPU/PT 205 is not required to translate the logical addresses of the pages of the graphics buffer 208 into physical addresses.

Generally, the CPU/PT 205 in the host computer system 112 resides only in virtual memory space 201 (FIG. 2A) and is accessible only by processor 102. The CPU/PT 205 is generally not readily available within logical memory space 202 in the exemplary host computer system 112. If paging is active within the exemplary host computer system 112, then the physical addresses of the pages of the graphics buffer 208 are not identical to the logical addresses of the pages of the graphics buffer 208. In this case, the CPU/PT 205 is required to translate the logical addresses of the pages of the graphics buffer 208 into their mapped physical addresses, the physical pages being possibly discontiguous.

The PGD 109 of FIG. 1 cannot readily access the CPU/PT 205. Therefore, one aspect of the present invention builds a graphics device page table (GDPT) 206 to provide the PGD 109 with access to the physical addresses of the pages of the graphics buffer 208 that can be discontiguous in physical memory space 203. The GDPT 206 is stored in logical and physical memory space 202, 203 according to the method of the present invention which is explained below.

Figure 3A:
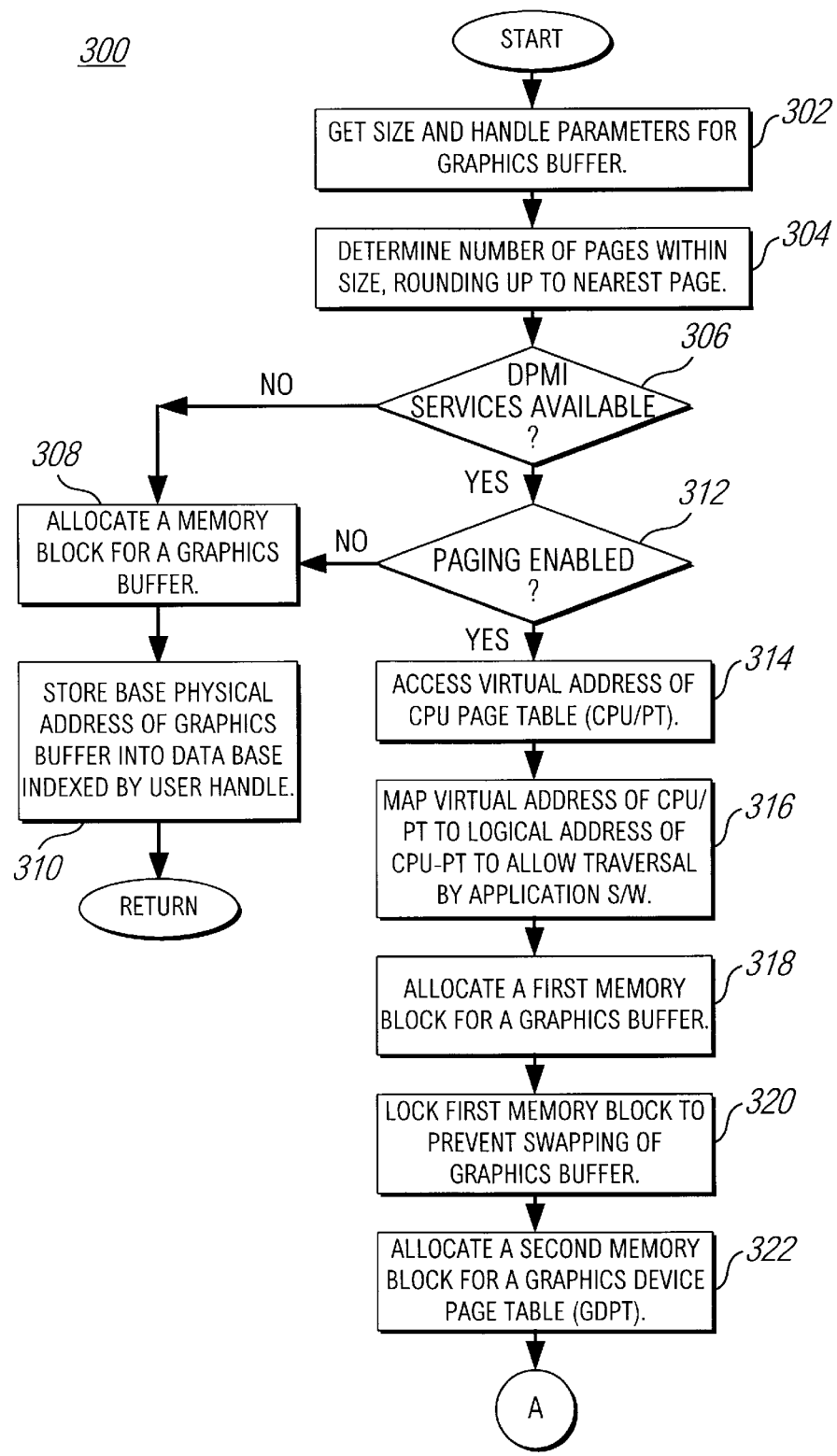
FIGS. 3A and 3B show a flow diagram for a method of the present invention for determining whether pages of a graphics buffer (GB) are contiguous in physical memory space and, if not, for building a GDPT of the present invention.
Figure 3B:
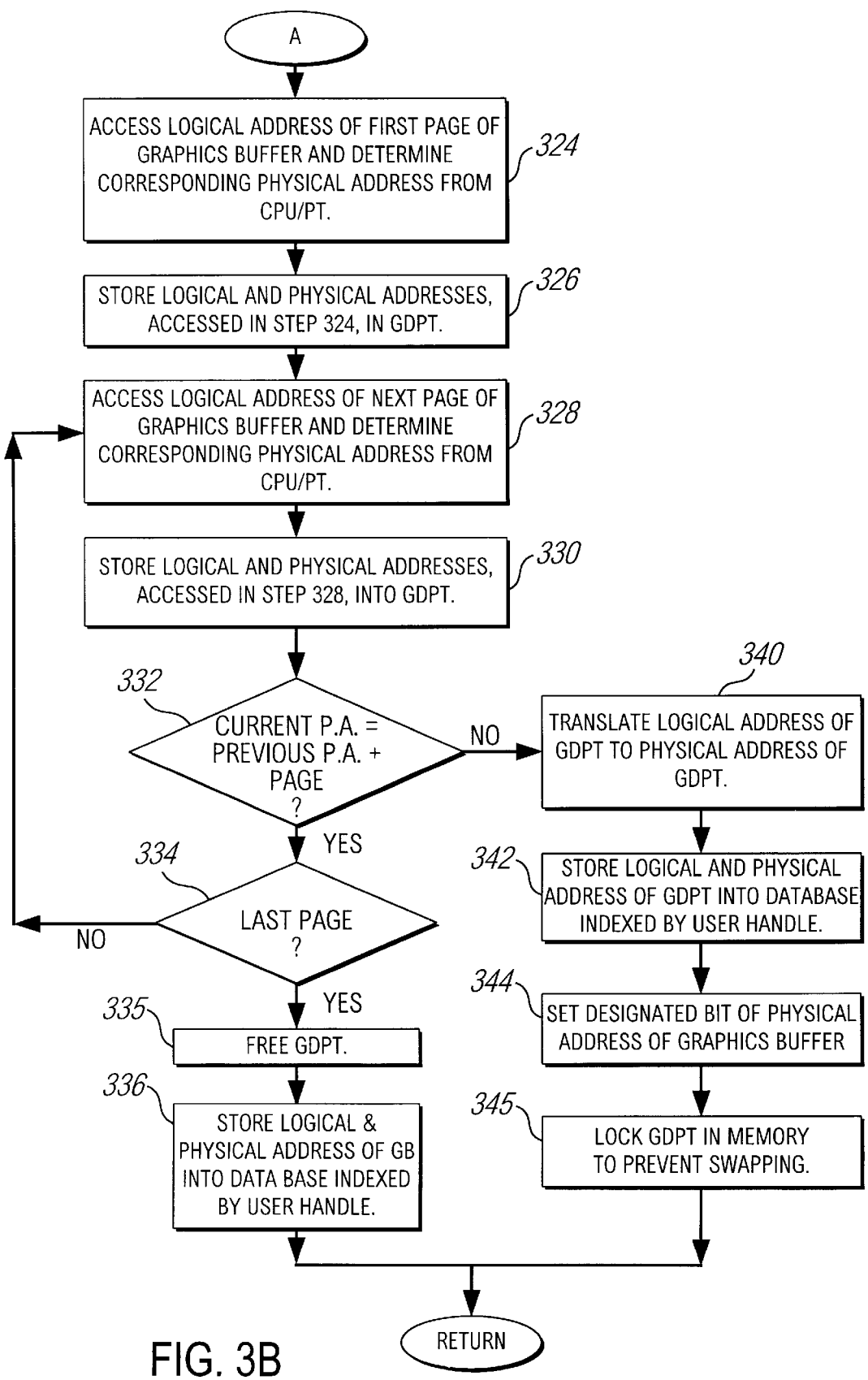

FIGS. 3A and 3B show a flow diagram of the steps of process 300, according to the method of the present invention, for determining whether pages of a created graphics buffer 208 are contiguous in physical memory space. Provided that the pages of the graphics buffer 208 are not contiguous in physical memory space, the process 300 builds the GDPT 206 so that the PGD 109 can access the pages of the graphics buffer 208. Process 300 is implemented as program code stored in computer readable memory units of system 112. The program code is executed over host processor 101 to perform the below described steps.

With reference to FIG. 3A, step 302 of the process 300 calls for receiving a user request to allocate memory, for the graphics buffer 208, of a predetermined size and handle. Step 304 of process 300 calls for determining the number of pages, of a page size used by the host computer system 112, within the predetermined size of the graphics buffer 208. The number of pages, within the predetermined size of the graphics buffer, are determined by a method which rounds up to the nearest page. In the preferred embodiment of the present invention, step 304 is implemented using Boolean Relationships (2) and (3), below;

If Size AND 4095 is non zero, then Size=Size+4096 (2).

Size=Size AND (NOT 4095) (3)

Boolean Relationships (2) and (3) assume that the page size, used by the host processor 101 in the preferred embodiment, is 4 kilobytes. However, the method of the present invention is also well suited for host computer systems using different page sizes (e.g., 1, 2, 8 Kilobytes). Boolean Relationships (2) and (3) yield an integer number for the number of pages required to store the predetermined size of the graphics buffer.

Step 306 of the process 300 of FIG. 3A calls for determining whether DOS protected mode interface (DPMI) services are currently active within the host computer system 112 (FIG. 1). If DPMI services are not currently active within the host computer system 112 (FIG. 1), then paging is assumed not to be active and all physical pages of the graphics buffer 208 are assumed to be contiguous in physical memory space 203.

Provided DPMI services are not currently active within the host computer system 112, process 300 proceeds to steps 308 and 310 which can be implemented using well known processes and techniques. Step 308 calls for allocating a memory block, in logical and physical memory space, for the graphics buffer 208. The memory block allocated in step 308 includes the appropriate number of pages which is determined above in step 304. Step 308 can be implemented using a number of well known memory allocation software procedure calls of the "C" programming language. One such memory allocation procedure call that can be used at step 308 is a DPMI memory allocation call. Step 310 stores the base physical address of the graphics buffer 208 (generated at step 308) into the database 209 of FIG. 2B, which is indexed by a user handle. Provided DPMI services are not currently active within the host computer system 112, the execution of steps 308 and 310 concludes the process 300.

Provided DPMI services are active within the host computer system 112, process 300 proceeds to step 312 of FIG. 3A which determines whether paging is active within the host computer system 112. In an exemplary embodiment of the present invention, the host microprocessor 101 is of the x86 architecture (e.g., an 80386 microprocessor). It can be determined whether paging is active in an x86 type microprocessor by examining the contents of control register zero (CR0) of the Intel 80386 type microprocessor. If bit thirty one of control register zero (CR0) of the Intel 80386 type microprocessor is set, then paging is active in the host computer system 112. This is checked at step 312.

Provided paging is not currently active within the host computer system 112, all physical pages of the graphics buffer 208 are assumed to be contiguous in physical memory space 203 and process 300 proceeds from step 312 to execute steps 308 and 310, as described above, which concludes the process 300.

Provided paging is currently active within the host computer system 112, process 300 proceeds to step 314 of FIG. 3A to access the virtual address of the CPU/PT 205 of FIG. 2B. In the preferred embodiment of the present invention, the virtual address of the CPU/PT 205 is accessed at control register 3 (CR3) of an Intel 80386 type microprocessor which realizes the host microprocessor 101 of FIG. 1. Step 316 then maps or translates the virtual address of the CPU/PT 205 to a logical address of the CPU/PT 205 to allow traversal by a user application software.

Step 318 allocates a first memory block in the logical and physical memory spaces 202, 203 for the graphics buffer 208 of FIG. 2B. In an exemplary embodiment of the present invention, the first memory block is allocated using a "C" function call as described with reference to step 308. A number of well known memory allocation procedures can be employed at step 318. The memory block allocated in step 318 is sized to include the appropriate number pages determined above in step 304 based on the size parameter received for the graphics buffer in step 302. Step 320 locks the first memory block allocated in step 318 to prevent swapping of the pages of the first memory block from main memory of the host computer system 112 to disk storage 104. In a preferred embodiment of the present invention, the first memory block is locked using a DPMI call. The first memory block is locked to ensure that all pages of the graphics buffer 208 are present in the physical memory space 203 when accessed by the PGD 109.

Step 322 of FIG. 3A allocates a second memory block, in logical and physical memory space, for storage of the GDPT 206 of FIG. 2B. The next four steps (324, 326, 328, and 330), of the process 300, build the GDPT 206 of the present invention. Step 324 of FIG. 3B accesses the logical address of the first page of the graphics buffer 208 (generated at step 318) and determines the corresponding physical address of the first page of the graphics buffer 208 from the CPU/PT 206. Step 326 stores the logical and physical addresses, accessed in step 324, into an entry in the GDPT 206. This step builds a copy of the CPU/PT 206 in physical memory space 203 that is accessible by the PGD 109. Step 328 then accesses the logical address of the next page of the graphics buffer 208 and determines the corresponding physical address of the next page of the graphics buffer 208 from the CPU/PT 206. Step 330 stores the logical and physical addresses, accessed in step 328, into the GDPT 206. Again, step 330 acts to construct the entries of the GDPT 206 in physical memory in a location and in a form that is accessible by the PGD 109.

Step 332 of FIG. 3B determines whether the physical addresses of the current and previous pages of the graphics buffer 208 are contiguous with each other in physical memory space. In an embodiment of the present invention, step 332 is implemented by determining whether the physical address of the current page is equal to the sum of the physical address of the previous page and the page size, in bytes, used by the host computer system 112. Provided that the current and previous pages of the graphics buffer 208 are contiguous with each other in physical memory space, the process 300 proceeds to step 334 to determine whether the current page of the graphics buffer 208 is the last page of the graphics buffer 208. Provided that the current page of the graphics buffer 208 is not the last page of the graphics buffer 208, the process 300 returns to step 328 to access the logical address of the next page of the graphics buffer 208 and determine the corresponding physical address of that page of the graphics buffer 208 from the CPU/PT 205. It is appreciated that the logical address of the GDPT 206 in physical memory space are in a location and in a form that is accessible by the PGD 109. Provided that all of the pages of the graphics buffer 208 are found to be contiguous with each other in physical memory space, the process 300 proceeds to step 336 which stores the logical and physical base address of the graphics buffer 208 into the database 209 indexed by a user handle. At step 336, although the GDPT 206 was constructed, it is not needed by the PGD 109 since the pages of the graphics buffer 208 in physical memory space 203 are contiguous. Provided that all of the pages of the graphics buffer 208 are contiguous in physical memory space, step 335 of FIG. 3B frees the memory block, allocated for the GDPT 206, in step 322.

If it is detected in step 332 that one of the pages of the graphics buffer 208 is not contiguous in physical memory space with a previous page of the graphics buffer 208, then the process 300 proceeds to step 340. Step 340 determines the physical base address of the GDPT 206 from the logical base address of the GDPT 206 using the CPU/PT 205. Step 342 stores the logical and physical base addresses of the GDPT 206 into database 209 indexed by a user handle. Step 344 then sets a designated bit of the physical address of the graphics buffer 208 to indicate that the graphics buffer 208 is discontiguous. In a preferred embodiment of the present invention, step 344 sets (e.g., to "1") bit zero of the physical base address of the graphics buffer 208 to indicate that the graphics buffer 208 is discontiguous. Otherwise, bit zero is a logical "0". Provided that all of the pages of the graphics buffer 208 are not contiguous in physical memory space, the GDPT 206 is needed. Step 345 locks the GDPT 206 in memory to prevent swapping.

Process 300 effectively generates a GDPT 206 in a memory space and in a form that can be accessed by the PGD 109 from physical memory space 203. As discussed below, the PGD 109 can make use of the GDPT 206 to advantageously locate the physical pages of a physical memory discontiguous graphics buffer 208. In this manner, a very large graphics buffer 208 (e.g., more than one page) that is stored in discontiguous physical memory pages can be directly accessed by the PGD 109 for graphics rendering without interruption of the host processor 101 (FIG. 1).

Figure 4:
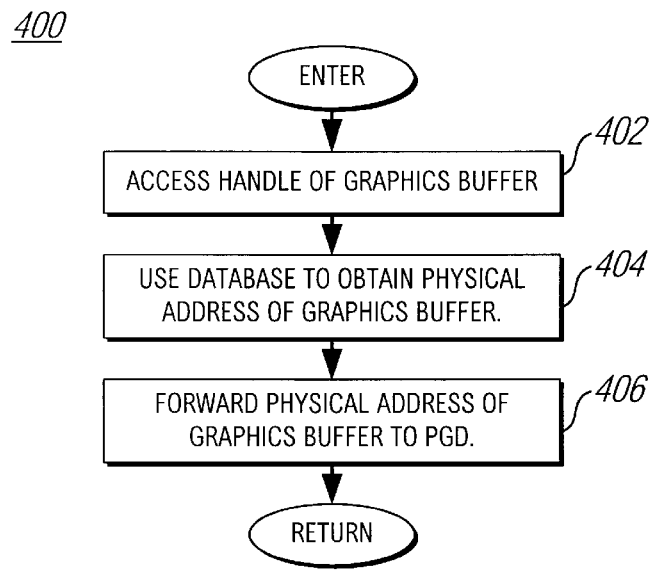
FIG. 4 shows a flow diagram for a process 400, according to the method of the present invention, for providing the PGD with a physical address of a graphics buffer.

With reference to FIG. 4, a flow diagram is shown for a process 400, according to the method of the present invention, for providing the PGD 109 with a physical address of the graphics buffer 208 generated by process 300. Process 400 is implemented as program code stored in computer readable memory units of system 112. The program code is executed over host processor 101. Step 402 accesses a handle of the graphics buffer 208. Step 404 uses the database 209 to obtain the physical address of the graphics buffer indexed by the handle of the graphics buffer desired. Finally, step 406 forwards the physical address of the graphics buffer 208 to the PGD 109 of FIG. 1. Process 400 is generally performed by the host computer system 112 in advance of instructing the PGD 109 to process the data stored in the graphics buffer 208. Therefore, in between constructing the graphics buffer 208 by process 300 and performing process 400, data is loaded into graphics buffer 208 by system 112.

Figure 5:
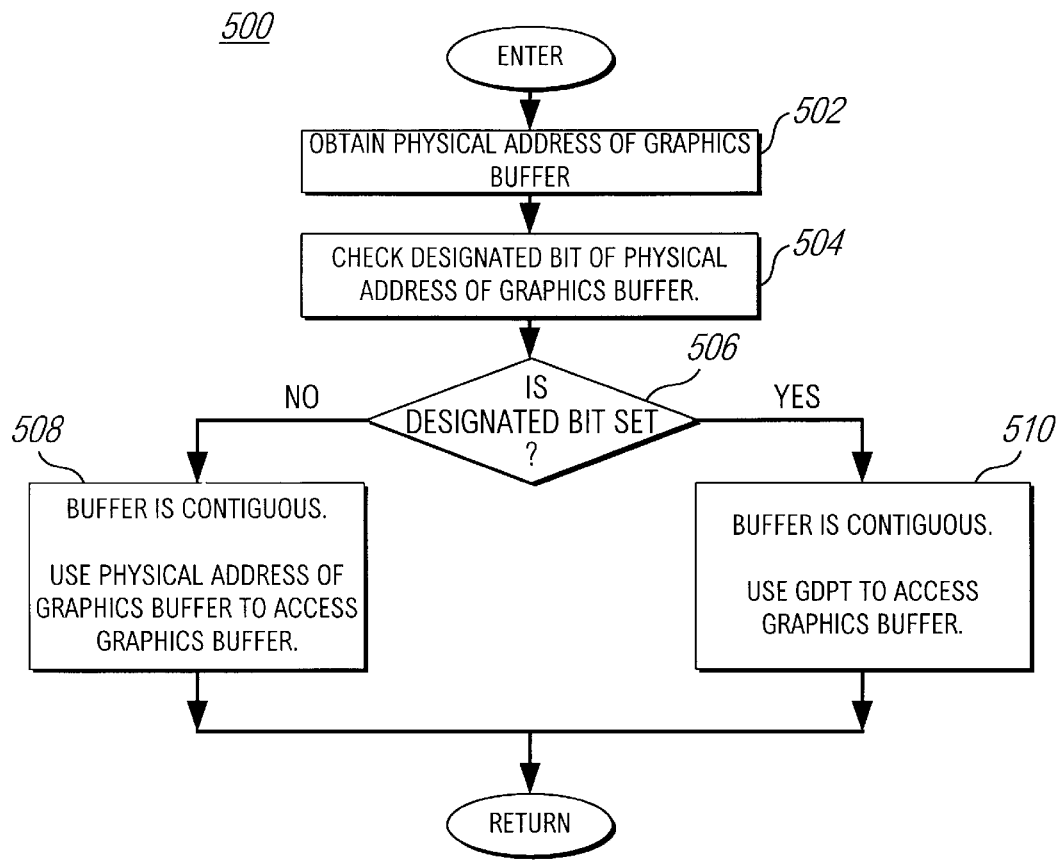
FIG. 5 shows a flow diagram for a process 500, according to the method of the present invention, for accessing a graphics buffer via a GDPT if pages of the graphics buffer are not all contiguous in physical memory space or via a physical base address if the pages of the graphics buffer are all contiguous in physical memory space.

With reference to FIG. 5, a flow diagram is shown for a process 500 according to the method of the present invention. Process 500 is implemented as program code and can be stored in computer readable memory units of system 112. In the preferred embodiment of the present invention, this program code is stored in computer readable memory units within the PGD 109 of FIG. 1. Also in the preferred embodiment of the present invention, the program code of process 500 is executed over the display processor 110 of FIG. 1. However, the present invention is also well suited in alternative embodiments to executing the program code of process 500 over the host processor 101 or dedicated logic circuitry. Process 500 can be invoked after a request by the PGD 109 to system 112 for the physical address of a graphics buffer 208 or can be interrupt driven and responsive to system 112 asynchronously forwarding the physical address to PGD 109 directly. In step 502, the physical address of the graphics buffer 208 is received. In step 504, it is determined whether the designated bit of the physical address of the graphics buffer 208 is set.

Provided that the designated bit (bit zero) of the physical address of the graphics buffer 208 is not set, then the pages of the graphics buffer 208 are assumed to be contiguous in physical memory space 203 and the process 500 proceeds to step 508. In step 508, the PGD 109 uses the initial physical address of the graphics buffer 208 to access the graphics buffer 208. The subsequent physical pages of graphics buffer 208 are then sequentially accessed for processing until an EOF is encountered. Provided that the designated bit of the physical address of the graphics buffer 208 is set, the pages of the graphics buffer 208 are assumed to be discontiguous in physical memory space 203 and the process 500 proceeds to step 510. In step 510, the PGD 109 accesses the starting address of the GDPT 206 and uses the GDPT 206 entries to locate and access the physical pages of the graphics buffer 208 for processing. This is allowed because the GDPT 206 offers the PGD 109 an accessible mapping between the virtual addresses of the pages of the graphics buffer 208 and the corresponding physical space addresses. By using the GDPT 200, the PGD 109 can locate the discontiguous physical pages that make up the graphics buffer 208 and access them for graphics rendering (e.g., a stored display list).

The preferred embodiment of the present invention, a method for determining whether memory is contiguous and for building a page table, is thus described. While the present invention has been described in particular embodiments, it should be appreciated that the present invention should not be construed as limited by such embodiments, but rather construed according to the below claims.

What is claimed is:

1. In a computer system having a host processor coupled to a bus, physical memory coupled to said bus, and a peripheral graphics device, a computer implemented method for providing said peripheral graphics device with access to pages of a graphics buffer stored in said physical memory, said method comprising the computer implemented steps of:

(a) allocating pages of said physical memory to said graphics buffer, said physical pages capable of being discontiguous in said physical memory;

(b) building a graphics device page table which maintains a mapping between logical and physical addresses of each page of said graphics buffer, said step of building performed by said host processor and comprising the step of reading a processor page table which is not accessible to said peripheral graphics device, wherein said graphics device page table comprises a plurality of entries, each entry containing a logical address of said graphics buffer and its corresponding physical address;

(c) determining whether all pages of said graphics buffer are contiguous in said physical memory; and (d) provided all of said pages of said graphics buffer are contiguous in physical memory space, supplying a base physical address of said graphics buffer to enable said peripheral graphics device to access said graphics buffer;

provided any of said pages of said graphics buffer are not contiguous in said physical memory, supplying a base physical address of said graphics device page table to said peripheral graphics device to enable said peripheral graphics device to access said graphics buffer.

2. The computer implemented method of claim 1 wherein said step of determining whether all of said pages of said graphics buffer are contiguous in physical memory space comprises the step of determining, for each page of said graphics buffer, whether the physical address of a current accessed page is equal to a sum of a physical address of a previously accessed page and a page size used by said computer system.

3. In a computer system having a host processor coupled to a bus, physical memory coupled to said bus, and a peripheral graphics device, a computer implemented method for providing said peripheral graphics device with access to pages of a graphics buffer stored in said physical memory, said method comprising the computer implemented steps of:

(a) allocating pages of said physical memory to said graphics buffer, said physical pages capable of being discontiguous in said physical memory;

(b) building a graphics device page table which maintains a mapping between logical and physical addresses of each page of said graphics buffer, said step of building performed by said host processor and comprising the step of reading a processor page table which is not accessible to said peripheral graphics device, wherein said graphics device page table comprises a plurality of entries, each entry containing a logical address of said graphics buffer and its corresponding physical address;

(c) determining whether all pages of said graphics buffer are contiguous in said physical memory; and (d) provided all of said pages of said graphics buffer are contiguous in physical memory space, supplying a base physical address of said graphics buffer to enable said peripheral graphics device to access said graphics buffer;

provided all of said pages are not contiguous in physical memory space, performing the steps of;

(1) storing a logical and physical address of said graphics device page table into a database indexed by a user handle associated with said graphics buffer, (2) setting a designated bit of said physical address of said graphics buffer to indicate that not all of said pages of said graphics buffer are contiguous in said physical memory;

(3) forwarding said physical address of said graphics buffer to said peripheral graphics device;

(4) said peripheral graphics device determining whether said designated bit of said physical address of said graphics buffer is set; and (5) provided said bit of said physical address of said graphics buffer is set, said peripheral graphics device using said graphics device page table to access discontiguous pages of said graphics buffer.

4. A computer system comprising a host processor coupled to a bus, physical memory coupled to said bus, and a peripheral graphics device, said physical memory containing program instructions which when executed over said computer system causes said computer system to implement a method for providing said peripheral graphics device with access to pages of a graphics buffer stored in said physical memory, said method comprising the computer implemented steps of:

accessing a starting virtual address of a processor page table which is not accessible to said peripheral graphics device;

mapping said starting virtual address of said processor page table to a starting logical address to allow traversal by a user application;

allocating a logical and physical memory block for said graphics device page table;

using said processor page table to sequentially access said logical address of each page of said graphics buffer and determine a corresponding physical address of each page of said graphics buffer;

storing the logical and physical addresses of each page of said graphics buffer into said memory block;

determining whether all pages of said graphics buffer are contiguous in said physical memory; and provided all of said pages of said graphics buffer are contiguous in physical memory space, supplying a base physical address of said graphics buffer to enable said peripheral graphics device to access said graphics buffer;

provided any of said pages of said graphics buffer are not contiguous in said physical memory, supplying a base physical address of said graphics device page table to said peripheral graphics device to enable said peripheral graphics device to access said graphics buffer.

5. The computer system of claim 4 wherein said step of determining whether all of said pages of said graphics buffer are contiguous in physical memory space comprises the step of determining, for each page of said graphics buffer, whether the physical address of a current accessed page is equal to a sum of a physical address of a previously accessed page and a page size used by said computer system.

6. The computer system of claim 4 further comprising the steps of:

provided all of said pages are not contiguous in physical memory space, performing the steps of:

(1) storing a logical and physical address of said graphics device page table into a database indexed by a user handle associated with said graphics buffer;

(2) setting a designated bit of said physical address of said graphics buffer to indicate that not all of said pages of said graphics buffer are contiguous in said physical memory;

(3) forwarding said physical address of said graphics buffer to said peripheral graphics device;

(4) said peripheral graphics device determining whether said designated bit of said physical address of said graphics buffer is set; and (5) provided said bit of said physical address of said graphics buffer is set, said peripheral graphics device using said graphics device page table to access discontiguous pages of said graphics buffer.

7. In a computer system having a host processor, physical memory, and a peripheral graphics device, a computer implemented method for providing said peripheral graphics device with access to pages of a graphics buffer, said method comprising the computer implemented steps of:

receiving a request to allocate memory for a graphics buffer of a predetermined size;

determining the number of pages, of a page size used by the computer system, within said predetermined size;

allocating a first memory block of logical and physical memory for storing said graphics buffer and locking said first memory block to prevent swapping of pages of said first memory block out of aid physical memory;

building a graphics device page table in physical memory and accessible to said peripheral graphics device, said graphics device page table including the logical and physical addresses of each page of said graphics buffer, wherein said graphics device page table comprises a plurality of entries, each entry containing a logical address of said graphics buffer and its corresponding physical address;

determining whether all pages of said graphics buffer are contiguous in physical memory;

providing all of said pages of said graphics buffer are contiguous in said physical memory space, supplying said physical address of said graphics buffer to enable said peripheral graphics device to access said graphics buffer; and provided any of said pages of said graphics buffer are not contiguous in said physical memory, supplying said graphics device page table to enable said peripheral graphics device to access said graphics buffer.

8. The computer implemented method of claim 7 wherein said step of building a graphics device page table comprises the steps of:

accessing a starting virtual address of a processor page table in the computer system, said processor page table not accessible to said peripheral graphics device;

mapping said starting virtual address of said processor page table to a starting logical address to allow traversal by a user application;

allocating a second memory block in said physical memory for said graphics device page table; and sequentially accessing a logical address of each page of said graphics buffer and determining the corresponding physical address of each page of said graphics buffer from said processor page table and storing the logical and physical addresses of each page of said graphics buffer into said second memory block.

9. The computer implemented method of claim 7 wherein said step of supplying said physical address of said graphics buffer to enable said peripheral graphics device to access said graphics buffer comprises the steps of:

storing the physical and logical addresses of said graphics buffer into a database indexed by a user handle associated with said graphics buffer;

accessing a handle of said graphics buffer;

using said database to obtain a physical address of said graphics buffer; and forwarding said physical address of said graphics buffer to said peripheral graphics device.

10. The computer implemented method of claim 7 wherein said step of supplying said graphics device page table to enable said peripheral graphics device to access said graphics buffer comprises the steps of:

storing a logical and physical address of said graphics device page table into a database indexed by a user handle associated with said graphics buffer;

accessing a handle of said graphics buffer;

using said database to obtain a physical address of said graphics buffer;

forwarding said physical address of said graphics buffer to said peripheral graphics device;

said peripheral graphics device determining whether said designated bit of said physical address of said graphics buffer is set; and provided said designated bit of said physical address of said graphics buffer is set, said peripheral graphics device using said graphics device page table to access said graphics buffer.

11. The computer implemented method of claim 7 wherein said step of determining whether all of said pages of said graphics buffer are contiguous in physical memory is implemented by determining, for each page of said graphics buffer, whether a physical address of a current accessed page is equal to a sum of the physical address of the previously accessed page and said page size used by said computer system.

12. The computer implemented method of claim 7 wherein said step of determining the number of pages, of a page size used by the computer system, within said predetermined size is implemented by a Boolean process comprising the computer implemented steps of:

performing a first Boolean AND operation on said received predetermined size of said graphics buffer and said page size used by the computer system;

provided said first Boolean AND operation yields a non zero result, adding said page size to said received predetermined size; and performing a second Boolean AND operation on said predetermined size and the logical inverse of said page size used by the computer system.

\* \* \* \* \*